(12) United States Patent
Lovegreen et al.

(10) Patent No.: US 7,652,558 B2
(45) Date of Patent: Jan. 26, 2010

(54) MULTI-FUNCTION CUSTOMER SATISFACTION SURVEY DEVICE

(75) Inventors: Kenneth J. Lovegreen, Lake Kiowa, TX (US); Russell P. Blink, Plano, TX (US)

(73) Assignee: Long Range Systems, Inc., Addison, TX (US)

( * ) Notice: Subject to any disclaimer, the term of this patent is extended or adjusted under 35 U.S.C. 154(b) by 830 days.

(21) Appl. No.: 11/257,977

(22) Filed: Oct. 25, 2005

(65) Prior Publication Data
US 2006/0085267 A1   Apr. 20, 2006

Related U.S. Application Data

(63) Continuation-in-part of application No. 09/882,457, filed on Jun. 14, 2001, now Pat. No. 6,960,988.

(51) Int. Cl.
G08B 5/36 (2006.01)
H04W 4/00 (2006.01)
G06Q 50/00 (2006.01)

(52) U.S. Cl. .............. 340/286.09; 206/557; 235/376; 455/424; 705/10; 705/15

(58) Field of Classification Search ......... 235/383–386, 235/375, 376; 206/557; 340/286.01, 286.09; 342/353, 419; 455/424; 705/10, 11, 15
See application file for complete search history.

(56) References Cited

U.S. PATENT DOCUMENTS

| D254,944 | S |   | 5/1980 | Lee et al. |
| 4,882,675 | A |   | 11/1989 | Nichtberger et al. |
| 5,023,929 | A | * | 6/1991 | Call ........................ 725/14 |
| D333,743 | S |   | 3/1993 | Johnson |
| 5,237,157 | A |   | 8/1993 | Kaplan |
| 5,288,565 | A |   | 2/1994 | Gruenstern |
| 5,355,115 | A |   | 10/1994 | Goor et al. |
| 5,587,560 | A |   | 12/1996 | Crooks et al. |
| 5,813,748 | A |   | 9/1998 | Maxymych |
| 5,893,075 | A |   | 4/1999 | Plainfield et al. |

(Continued)

FOREIGN PATENT DOCUMENTS

EP    1 059 599 A2    12/2000

OTHER PUBLICATIONS

Hayes, Jack; "Freebies and other kid-friendly frills: family chains learn tricks of children's dining trade"; *Nation's Restaurant News*, v30, n3, p. 35(3); Jan. 15, 1996.

*Primary Examiner*—Andrew Joseph Rudy
(74) *Attorney, Agent, or Firm*—Steven W. Smith

(57) ABSTRACT

A multi-function customer satisfaction survey device, system, and method. A restaurant management system includes a plurality of electronic tip trays and a base unit. Each of the tip trays electronically obtains and stores customer contact information, customer payment information, and responses to a customer satisfaction survey. A data transceiver wirelessly transmits the information to the base unit. The base unit collects the information and sends the contact information to a correspondence server such as an e-mail server. The payment information is sent to an external authorization network and/or the restaurant's POS system. The survey responses are sent to an analysis unit. Particularly adverse or positive responses may be matched through the POS system to a food server and a food order.

14 Claims, 4 Drawing Sheets

U.S. PATENT DOCUMENTS

| | | | |
|---|---|---|---|
| 6,067,046 A * | 5/2000 | Nichols | 342/357.14 |
| 6,310,783 B1 | 10/2001 | Winch et al. | |
| 6,380,928 B1 | 4/2002 | Todd | |
| 6,443,359 B1 * | 9/2002 | Green et al. | 235/379 |
| 6,636,835 B2 * | 10/2003 | Ragsdale-Elliott et al. | 705/15 |
| 6,760,595 B2 * | 7/2004 | Inselberg | 455/517 |
| 6,850,767 B1 * | 2/2005 | Maxymych | 455/461 |
| 6,940,394 B2 * | 9/2005 | Gagnon | 340/286.09 |
| 6,971,063 B1 * | 11/2005 | Rappaport et al. | 715/733 |
| 7,013,136 B2 * | 3/2006 | Frangione et al. | 455/424 |
| 7,024,698 B2 * | 4/2006 | Tanaka et al. | 726/26 |
| 2002/0107717 A1 | 8/2002 | Liu et al. | |

* cited by examiner

MULTI-FUNCTION CUSTOMER SATISFACTION SURVEY DEVICE

RELATED APPLICATIONS

This application is a continuation-in-part of U.S. patent application Ser. No. 09/882,457 filed Jun. 14, 2001 now U.S. Pat. No. 6,960,988.

BACKGROUND OF THE INVENTION

This invention relates to data processing systems for gathering and compiling data for management analysis, and more particularly, to a wireless multi-function customer satisfaction survey device that also functions as a restaurant tip tray, calculator, database input device, and payment terminal.

U.S. Pat. No. Des. 333,743 to Johnson illustrates the design for a combined restaurant check tray and calculator. The Johnson design is essentially a tray configuration with a keypad in the top surface of the tray, and a numerical display in a frame portion at one end of the tray. Johnson, however, does not teach or suggest combining a customer satisfaction survey device with the illustrated design.

U.S. Pat. No. 5,893,075 to Plainfield et al. discloses a PC-based, interactive, programmable system that induces customers of a restaurant to enter information about themselves or to answer survey questions. The program is run on a PC, and the customer enters the information in data fields displayed on the PC's monitor. Plainfield, however, does not teach or suggest that a computerized survey device could be combined with a restaurant tip tray and a calculator.

U.S. Pat. No. 5,587,560 to Crooks et al. discloses a system for capturing handwritten data. The system includes a base station (PC), a docking station, and a plurality of portable handwriting capture devices, which may be in the form of pads or trays. Captured signatures are digitized, and may be used to obtain a purchase request from a customer. When the trays are placed in the docking station, the digitized signatures are transferred through the docking station to the base station/PC. Crooks, however, does not teach or suggest a wireless payment terminal or a payment terminal combined with a computerized survey device, a restaurant tip tray, a calculator, and a database input device.

U.S. Pat. No. 6,380,928 to Todd discloses a portable electronic survey and satisfaction questionnaire device in the form of a book that opens to reveal a calculator pad, electronic display, and keypad for entering responses to survey questions. The device may transmit a page to a manager's pager if a customer enters a particularly adverse or particularly positive response. Todd, however, does not teach or suggest that a computerized survey device could be combined with a restaurant tip tray or a wireless payment terminal.

Restaurant managers have a need to induce customers to answer customer satisfaction surveys so that the managers can identify problem areas and correct them. In addition, the collected information must be compiled quickly and easily into a database that managers can easily and quickly access. This can be a serious problem when a restaurant chain has many restaurants spread out over a large area. Additionally, restaurants would like to provide customers with more efficient and easier ways to pay their bills.

It would be advantageous, therefore, to have a survey system and device that overcomes these disadvantages. The present invention provides such a system and device.

SUMMARY OF THE INVENTION

In one aspect, the present invention is directed to a restaurant management system comprising a plurality of electronic tip trays and a base unit. Each of the tip trays includes a rechargeable battery, electronic means for obtaining and storing customer responses regarding a level of customer satisfaction, and a data transceiver for wirelessly transmitting the responses to the base unit. The base unit includes a battery recharger for recharging the rechargeable battery in each tip tray when the plurality of tip trays are stacked on the base unit, and a data transceiver for wirelessly receiving the responses from the tip trays.

The restaurant management system may also include a correspondence server and a point-of-sale (POS) system connected to the base unit. If so, each of the electronic tip trays also includes electronic means for obtaining and storing customer contact information and customer payment information. In addition, the base unit includes a connection to the correspondence server for sending the customer contact information to the correspondence server, a connection to an external financial authorization network for sending the customer payment information to the authorization network and for receiving payment authorizations from the authorization network, and a connection from the base unit to the POS system. The POS system includes a database for associating a tip tray number with a food-server, a food-order number, and food items included in the associated food-order. The database is adapted to match particularly adverse or particularly positive responses with associated food-servers and food-orders.

In another aspect, the present invention is directed to a computer-implemented method of managing customer information in a restaurant. The method includes presenting customer satisfaction survey questions to a customer utilizing a portable electronic survey device; electronically obtaining and storing the customer's responses in the survey device; wirelessly transmitting the responses from the survey device to a base unit; and analyzing the responses to derive management information.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
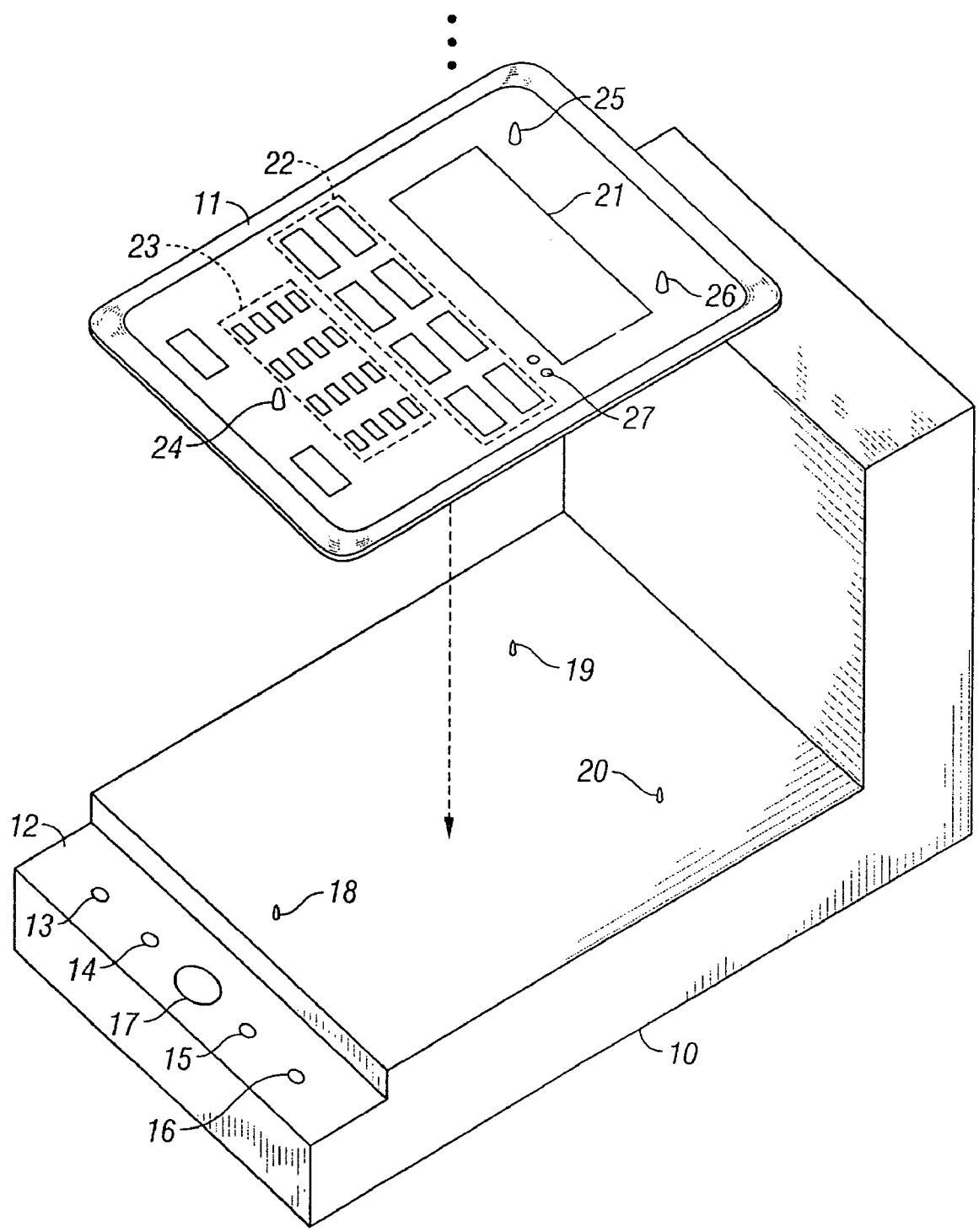
FIG. 1 is a perspective view of a base unit and survey tray in a first embodiment of the present invention.

FIG. 1 is a perspective view of a base unit and survey tray in the preferred embodiment of the present invention. The combination calculator, tip tray, and survey device includes a base unit 10 and a survey tray 11. Within a restaurant, up to 10 survey trays can be stacked on a single base unit. Once stacked, the trays can be simultaneously recharged. In addition, the trays can be simultaneously reprogrammed either locally or remotely, and data can be downloaded from the trays for transmission to local or remote databases. The base unit connects to either a PC through an RS232 interface, or to a Local Area Network (LAN) through a LAN interface, or to a remote computer and database through a modem. When a plurality of base units are used in a restaurant, the base unit connecting to the PC, LAN, or modem is referred to as the smart base. The other base units are referred to as extended bases, and they connect in daisy chain fashion (i.e., in series) to the smart base.

The base unit 10 includes a display panel 12 that includes a plurality of status indicator lights 13-16 and a reset button 17. The indicator lights may include, for example, an OK light 13, a Host Comm light 14 when data is being transferred to or from the base unit from the PC or other remote computer, a Tray Comm light 15 when data is being transferred to or from the trays from the base unit, and a Ready light 16 when the device has been initialized or reset and is ready for operation.

The base unit 10 includes three pins 18-20 that make contact with three contacts on the bottom surface of the survey tray. In the preferred embodiment, one pin provides DC power, another pin is Ground, and the third pin provides a path for data. The data pin may also be utilized to provide a reset command to the tray and any other trays stacked on top of it by presenting a negative voltage on the pin. In an alternative embodiment, there are only two pins, one for DC power and one for Ground. In this embodiment, the data is modulated on the power signal.

The survey tray 11 includes a display 21 such as an LCD display, a survey keypad 22, a calculator keypad 23, and three pins 24-26. The pins conduct the power, Ground, and data signals to subsequent trays stacked on top of the survey tray 11 through receptacles on the bottom of each tray that align with and contact the pins when the trays are stacked on top of each other. When the calculator mode is selected, the customer can use the survey tray to calculate a tip amount based on various percentages, or can use the tray to split the bill into different parts for each member of the party. When the survey mode is selected, questions are displayed on the display 21, and the customer answers them with the survey keypad 22. The calculator keypad may also be an alphanumeric keypad so that the customer may enter comments or other information such as their e-mail address. Each survey tray can store data from approximately 300-500 surveys, depending on the length of the survey, before the data must be downloaded. Indicator lights 27 provide an indication of how much memory space is available.

Although not shown in FIG. 1, and not visible to the customer, the survey tray also includes an internal paging transmitter that automatically pages the restaurant manager when a customer enters a response to a survey question that meets predetermined criteria. For example, For example, the manager may be paged if the customer enters a particularly good response indicating outstanding service or food, or if the customer enters a particularly bad response indicating that the service or food was unsatisfactory. In this way, the manager is alerted in time to visit the table to acknowledge the customer's satisfaction, or to assure the customer that the deficiency will be corrected the next time the customer comes to the restaurant.

The tray may also include a low power transmitter that transmits a low power signal that is sensed by a receiver located by the exit door of the restaurant such as a Radio Frequency Identification (RFID) tag. The receiver may trigger an alarm to indicate that a tray is being taken off the premises. This prevents loss of the trays due to theft.

In order to provide an incentive for customers to perform the survey, the restaurant management may implement a promotional feature that provides rewards such as free food or drinks to random customers or to customers at specific intervals. The management may set the odds of winning.

Figure 2:
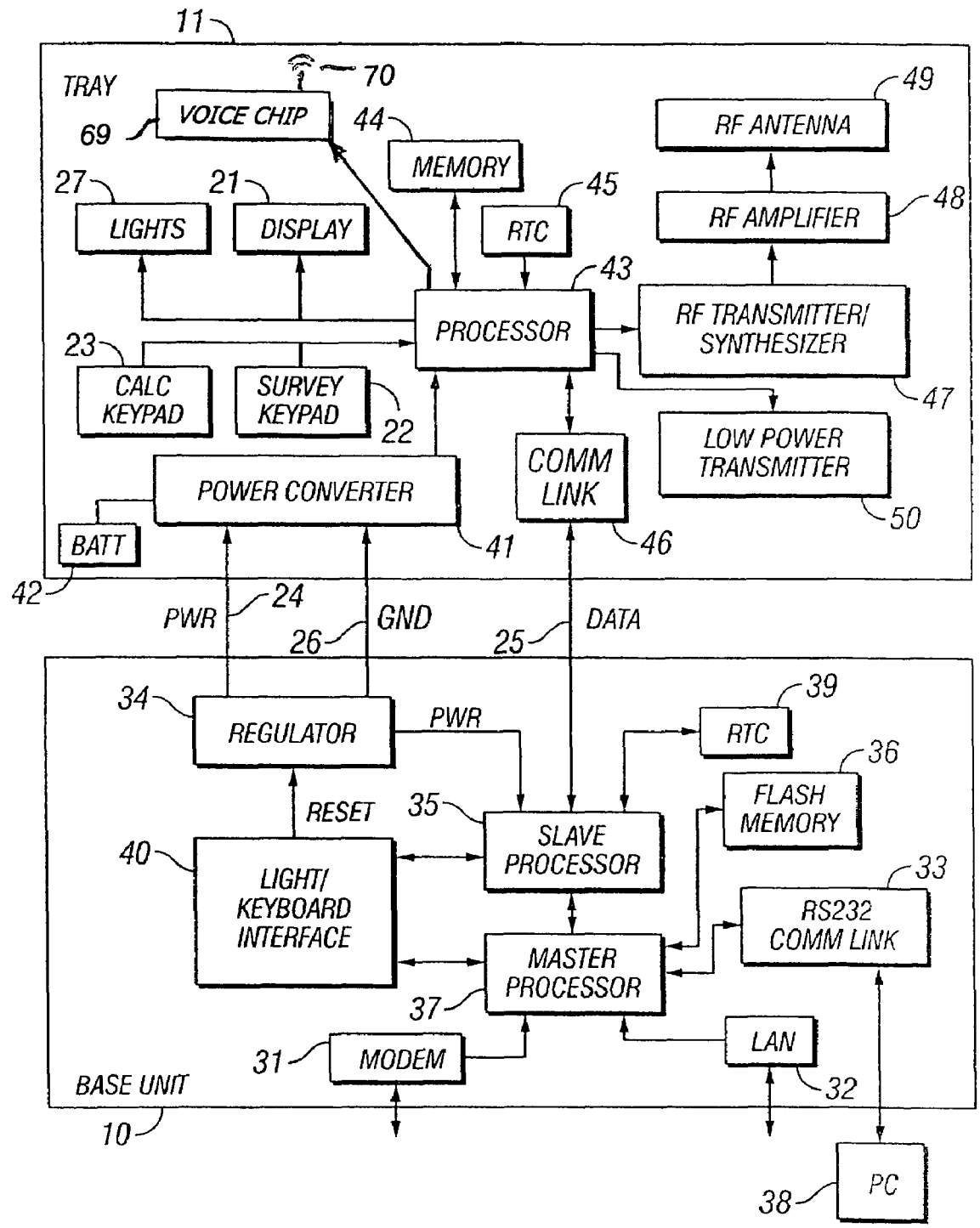
FIG. 2 is a simplified block diagram of the base unit and survey tray in the first embodiment of the present invention.

FIG. 2 is a simplified block diagram of the base unit 10 and survey tray 11 in the preferred embodiment of the present invention. On the back side of the base unit is a modem 31, a LAN connection 32, an RS232 serial port 33, and a DC power connector for a regulator 34. A Slave Processor 35 receives data through pin 25 and may pass it to a Master Processor 37 for storage in flash memory 36 or for transmission to a remote computer or database such as PC 38. A Real-Time Clock (RTC) 39 provides actual time of day to the Slave Processor. A light/keyboard interface 40 controls the status indicator lights 13-16 on the base unit, and receives the Reset command from the Reset button 17. The Reset command causes the Regulator 34 to switch the power and Ground signals being sent to a power converter 41 in the tray. This causes the tray processor 43 to erase the tray memory 44.

Once the survey tray has been reset and its battery 42 recharged, it is placed in standby mode by the server who may enter a server ID and a table number. A customer can then use the tray. The tray processor 43 collects inputs from the survey keypad 22 and the calculator keypad 23, and displays information on the display 21 and memory lights 27. Another RTC 45 provides time of day information to the tray processor. The customer responses to survey questions are stored in the tray memory 44 until they are downloaded through the Comm Link 46 to the base unit 10, PC 38, or other remote database or analysis function via the modem 31 or LAN connection 32. The Comm Link may be through a hard connection of a data pin 25 and a data receptacle on the tray, or the Link may be a wireless link. If the customer enters a response indicating particularly good or particularly bad service or food, the tray processor causes an RF transmitter/synthesizer 47 to send a paging signal to the restaurant manager. The signal is sent through an RF amplifier 48 and an RF antenna 49. As noted above, the tray may also include a low power transmitter 50 that transmits a low power signal that is sensed by a loss prevention receiver located by the exit door of the restaurant, such as an RFID tag.

Data may be sequentially downloaded from a number of trays by stacking them on a base unit or a plurality of linked base units. This can be done locally from the PC 38, or remotely over the LAN or the Internet. In addition, the trays can be reprogrammed through the base unit with a new or updated survey. The trays may also be programmed at the Point-of-Sale (POS) terminal when the server clears the tab at the conclusion of the meal and prepares the ticket for the table. At this time, the tray is programmed with the identity of the server and the table number. In this way, the survey results can be correlated to each server. In addition, if the tray pages the manager because of a particularly good or bad response to a survey question, the tray sends the table number in the paging message so that the manager knows which table to visit.

The individual tray programming may be performed manually by the server, or the base unit may be interfaced to the POS terminal through the RS232 interface for automatic programming of the server ID and the table number. If automatic programming is used, the interface to the POS terminal may be utilized to identify specific food items that were ordered at that particular table. Specific survey questions can then be uploaded to the tray so that the customer is asked specifically about the quality of the food that he ordered. For example, if the customer ordered a steak, the survey may include a question about whether or not the steak was properly prepared the way the customer requested.

Another feature of the device is a disablement "virus" that may be disseminated to all of the trays if the restaurant does not properly honor its contract with the supplier of the trays. For example, a disablement code can be downloaded through the base unit(s) to the trays that disables the trays until a proper reset code is entered. Alternatively, the disablement code may be manually entered on the calculator keypad of an individual tray.

The survey tray 11 may also include a voice chip 69 for providing voice prompts to the customer through a speaker 70. The voice prompts may provide instructions, or may simply thank the customer for taking the survey. For additional interest, the voice chip may synthesize or store recordings of one or more celebrity voices.

Figure 3:
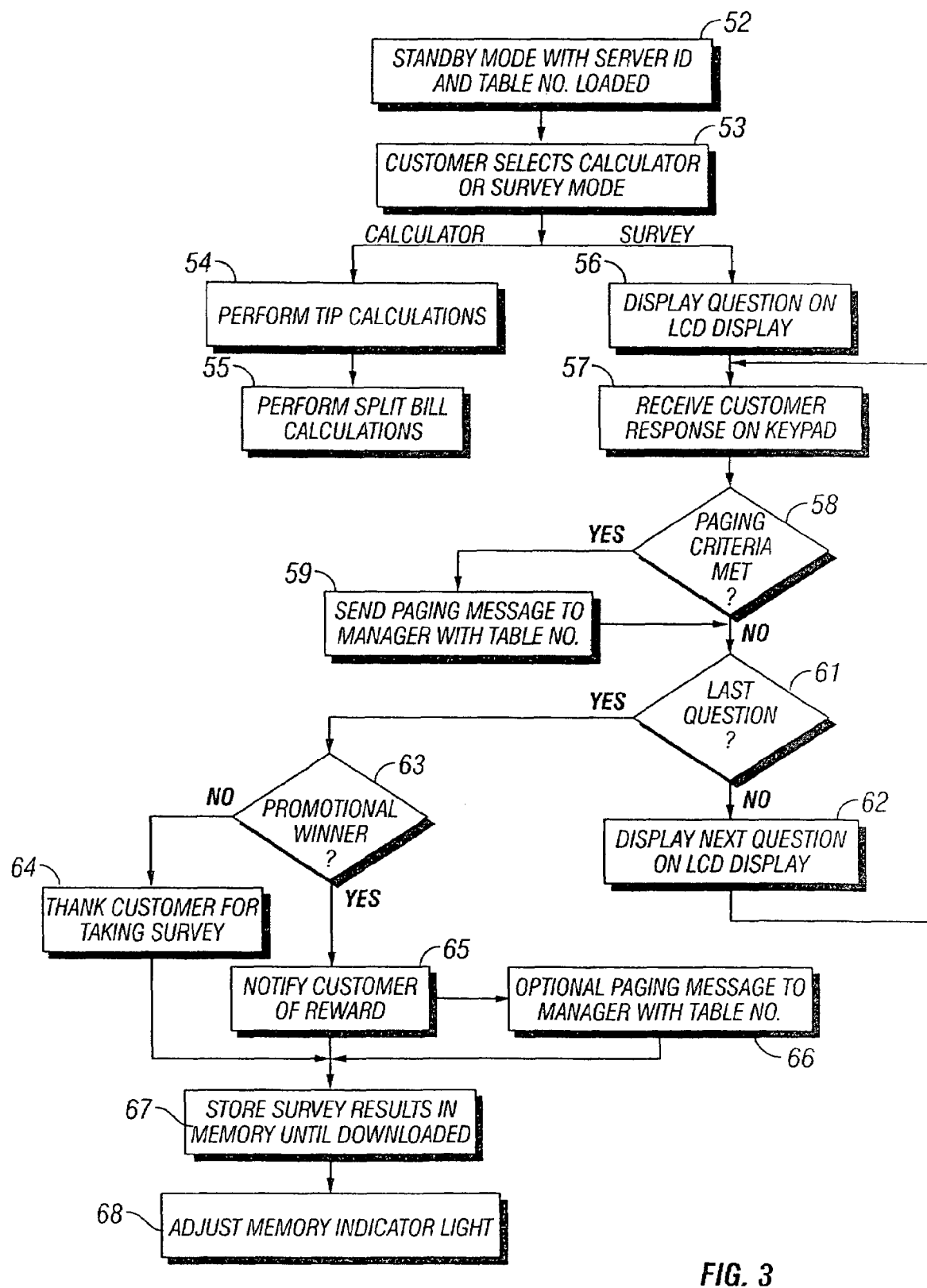
FIG. 3 is a flow chart of the steps taken by the present invention when a customer selects the calculator or survey mode of operation.

FIG. 3 is a flow chart of the steps taken by the present invention when a customer selects the calculator or survey mode of operation. At step 52, the survey tray 11 is in the standby mode, having been loaded with the server ID and the table number at the POS terminal. The tray may display a message about the restaurant's promotional program (i.e., possible rewards for taking the survey) on the LCD display while in the standby mode in order to provide an incentive for the customer to take the survey. At 53, the customer selects either the calculator mode or the survey mode of operation. If the calculator mode is selected, the tray performs tip calculations at 54 and split bill calculations at 55, or any other standard calculator functions.

If the customer selects the survey mode, the process moves from step 53 to step 56 where the first survey question is displayed on the LCD display 21. At 57, a customer response is received through the survey keypad 22 or through the alphanumeric keypad 23. At 58, it is determined whether or not the customer's response matched the predetermined criteria for paging the manager. For example, if the customer's choices are BEST, GOOD, FAIR, and POOR, and the customer enters BEST or POOR, the process moves to step 59 where the tray transmits a paging message to the restaurant manager with the table number. At 61, it is determined whether the question was the last survey question. If not, the next question is then displayed at step 62. The process then returns to step 57 and awaits the customer's response.

If it is determined at step 61 that the question was the last survey question, the process moves to step 63 where it is determined whether or not the customer is a winner in the restaurant's promotional program. This may be determined at random or at an interval set by the restaurant management (for example, every tenth customer). If the customer is not a winner, the customer is thanked at step 64 for taking the survey. If the customer is a winner, the customer is notified of the reward at 65. Optionally, the tray may page the manager at 66 so that the manager can congratulate the customer and/or bring a reward certificate to the table. At 67, the tray stores the survey results in memory 44 until the base unit 10 downloads the data. At 68, the tray adjusts the memory indicator light 27 to indicate the amount of memory space available.

Figure 4:
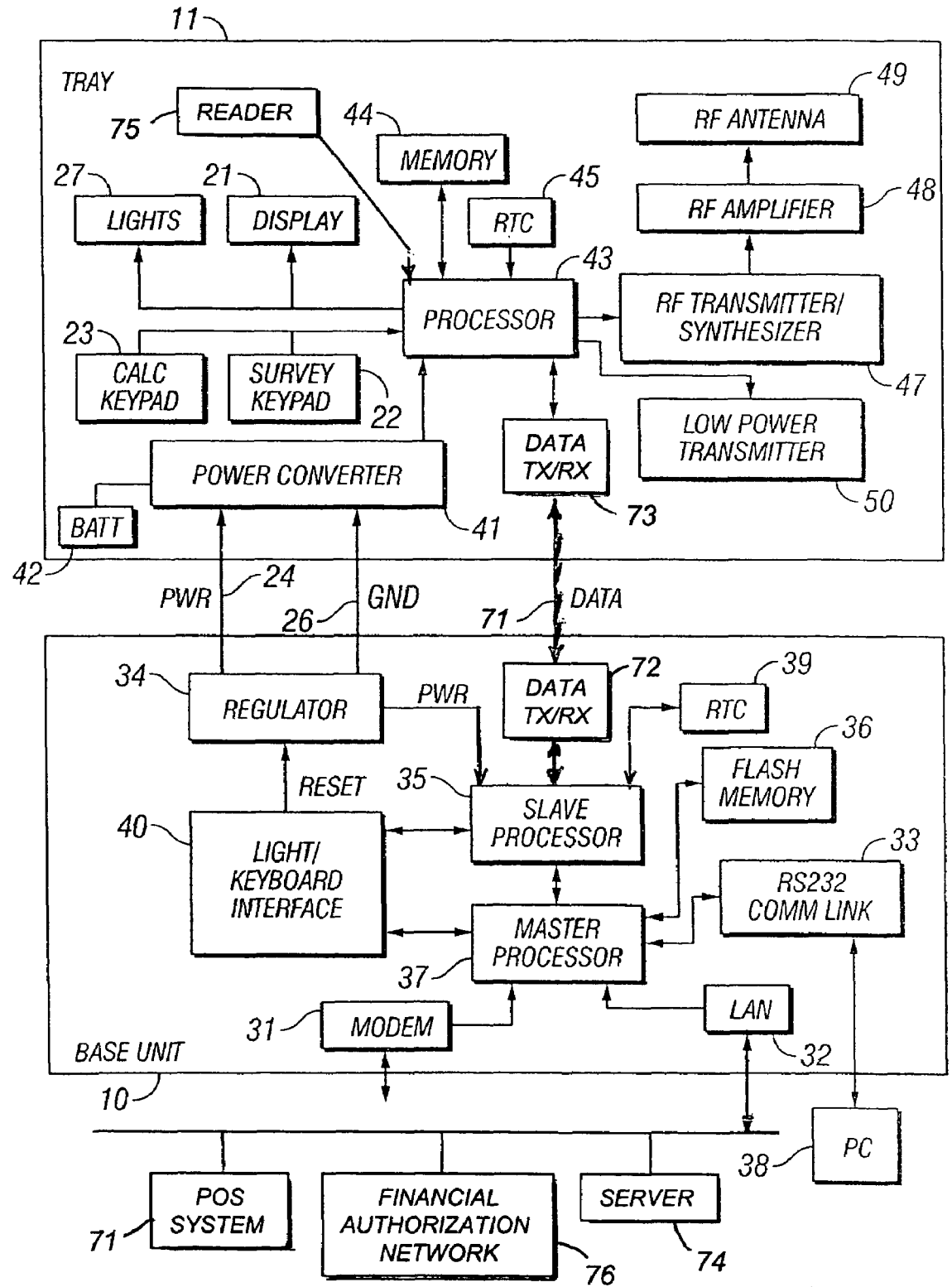
FIG. 4 is a simplified block diagram of the base unit and survey tray in a second embodiment of the present invention.

FIG. 4 is a simplified block diagram of the base unit and survey tray in a second embodiment of the present invention. In this embodiment, data is transferred via a wireless link 71 between the base unit 10 and the survey tray 11. There is no data pin on the base unit, and no data pins or receptacles on the survey trays. The power pins are still present, however, and the trays are stacked on the base unit for recharging. For data transfer, the base unit 10 and the survey tray 11 both include a data transceiver operating, for example at 2.4 GHz. At a predefined time, the data transceiver 72 in the base unit may send a command to an addressed tray number to download its collected data. This may occur while the trays are stacked for recharging, or at any other time. The processor 43 in the addressed tray retrieves the collected data from the memory 44, and the data transceiver 73 in the tray transmits the data to the base unit over the wireless link 71.

The survey tray 11 may also be programmed to transmit the data as soon as a customer completes a survey. In this case, the receiver portion of the data transceiver 73 may first determine that no other tray is transmitting before the data is transmitted.

It is also useful for restaurant managers to collect contact information, such as e-mail addresses, for their customers. With a list of e-mail addresses, a restaurant manager can send coupons and other discount offers to customers who have previously dined in the restaurant. These customers are more likely to return again, especially with a personalized e-mail inviting them back and offering a discount. The manager can also determine the frequency of visits by certain customers and perhaps reward them with a loyalty discount. Additionally, immediately following a customer's visit to the restaurant, the manager may send a "thank-you" e-mail on behalf of the restaurant staff.

Such an address database may be compiled by obtaining each customer's e-mail address as part of the survey. The base unit 10 may download the e-mail address database to the PC 38, or to a server 74, which maintains the database and sends periodic e-mail messages to the restaurant's customers. In one embodiment of the present invention, the server is remotely located from the restaurant and may be operated by a third party as a service to the restaurant.

In another embodiment, the survey tray 11 may also collect and wirelessly transmit payment information to the base unit 10. For example, the display 21 may prompt the customer to enter a credit card number, tip amount, or total payment amount through the calculator keypad 23. Alternatively, the tray may be equipped with a reader 75 for reading financial card information. For example, the reader may be a magnetic strip reader, optical reader, RFID smart card reader, or any other device suitable for obtain customer payment information. The processor 43 obtains the payment information, and the data transceiver 73 transmits it to the base unit 10 over the wireless link 71. The base unit may connect through the LAN 32 to an external financial authorization network 76 for authorizing credit and/or debit card transactions.

The base unit may also connect to the restaurant's point-of-sale (POS) system 77 where the tray number is associated with an order number, table number, and food-server number. This connection also enables exceptionally good or bad survey results to be associated with a particular food-server and/or particular food items that were ordered. Long-term analysis of the survey results can be used to judge employee performance and/or determine which food items on the menu are the most liked or disliked. Appropriate corrective action can then be taken.

The present invention may also post survey results on a website. The website may be utilized to provide to restaurant managers who are considering the purchase of a management system, examples of the types of information that the present invention can generate. The website may also have secure areas where managers utilizing the present invention can review the performance of their restaurants, in terms of customer satisfaction, in different areas of a city or across the country.

It is thus believed that the operation and construction of the present invention will be apparent from the foregoing description. While the system, apparatus, and method shown and described has been characterized as being preferred, it will be readily apparent that various changes and modifications could be made therein without departing from the scope of the invention as defined in the following claims.

What is claimed is:

1. A restaurant management system comprising:
a plurality of electronic tip trays; and
a base unit in wireless communication with the electronic tip trays;
wherein each of the tip trays includes:
a rechargeable battery;
electronic means for obtaining and storing customer responses regarding a level of customer satisfaction;
input means for receiving customer payment information; and
a data transceiver for wirelessly transmitting the responses and the customer payment information to the base unit; and
wherein the base unit includes:
a battery recharger for recharging the rechargeable battery in each tip tray when the plurality of tip trays are stacked on the base unit; and
a data transceiver for wirelessly receiving the responses and the customer payment information from the tip trays; and
a connection from the base unit to an external financial authorization network for sending the customer payment information to the external financial authorization network and receiving authorizations from the external financial authorization network.

2. The restaurant management system of claim 1, wherein the base unit is adapted to transmit a command to each tip tray to download the responses at a predefined time.

3. The restaurant management system of claim 1, further comprising a server connected to the base unit, wherein the tip trays also obtain and report customer contact information, and the base unit sends the customer contact information to the server for generation of customer correspondence.

4. The restaurant management system of claim 3, wherein the server is located remotely from the restaurant and is connected to the base unit through an Internet connection.

5. The restaurant management system of claim 4, wherein the customer contact information includes an e-mail address, and the server generates and sends e-mails to the customer regarding restaurant discount offers.

6. The restaurant management system of claim 1 wherein each of the tip trays also includes a circuit for generating audible voice information for communicating with the customer.

7. The restaurant management system of claim 1, wherein each tip tray also includes a paging transmitter for transmitting a page to a manager if a customer enters a particularly adverse or particularly positive response.

8. The restaurant management system of claim 7, further comprising a connection from the base unit to a paint-of-sale (POS) system, said POS system having a database for associating a tip tray number with a food-server, a tad-order number, and food items included in the associated food-order, wherein the database is adapted to match particularly adverse or particularly positive responses with associated food4ervers and food-orders.

9. The restaurant management system of claim 1, wherein the base unit data transceiver is adapted to wirelessly transmit survey questions to each of the tip trays.

10. The restaurant management system of claim 1, further comprising an analysis function in communication with the base unit for analyzing customer responses and creating management information as a result of the analysis.

11. The restaurant management system of claim 1, further comprising means for posting the customer responses and management information on a website.

12. A restaurant management system comprising:
a plurality of electronic customer information devices;
a base unit in wireless communication with the customer information devices;
a correspondence server connected to the base unit; and
a point-of-sale (POS) system connected to the base unit;
wherein each of the customer information devices includes:
a rechargeable battery;
electronic means for obtaining and staring customer responses to a customer satisfaction survey, customer contact information, and customer payment information; and
a data transceiver for wirelessly transmitting the responses, the contact information, and the payment information to the base unit; and
wherein the base unit includes:
a battery recharger for recharging the rechargeable battery in each customer information device when the plurality of customer information devices are stacked on the base unit;
a data transceiver for wirelessly transmitting survey questions to each of the customer information devices, and for receiving the responses, the contact information, and the payment information from the customer information devices;
a connection from the base unit to the correspondence server for sending the customer contact information to the correspondence server;
a connection from the base unit to an external financial authorization network for sending the customer payment information to the authorization network and for receiving payment authorizations from the authorization network; and
a connection from the base unit to the POS system, said POS system having a database for associating a tip tray number with a food-server, a food-order number, and food items included in the associated food-order, wherein the database is adapted to match particularly adverse or particularly positive responses with associated food-servers and food-orders.

13. The restaurant management system of claim 12, further comprising an analysis function in communication with the base unit for analyzing customer responses and creating management information as a result of the analysis.

14. The restaurant management system of claim 12, further comprising means for posting the customer responses and management information on a website accessible by selected managers.

* * * * *